United States Patent
Lee et al.

(10) Patent No.: US 10,920,783 B2
(45) Date of Patent: Feb. 16, 2021

(54) ROTOR ASSEMBLY FOR MOTOR

(71) Applicants: Hyundai Motor Company, Seoul (KR); Kia Motors Corporation, Seoul (KR)

(72) Inventors: Chang Ha Lee, Gyeonggi-do (KR); Hyunyoo Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 302 days.

(21) Appl. No.: 16/185,887

(22) Filed: Nov. 9, 2018

(65) Prior Publication Data

US 2019/0285073 A1    Sep. 19, 2019

(30) Foreign Application Priority Data

Mar. 15, 2018  (KR) .......................... 10-2018-0030379

(51) Int. Cl.
| | |
|---|---|
| F04D 25/06 | (2006.01) |
| F04D 29/053 | (2006.01) |
| H02K 7/18 | (2006.01) |
| H02K 1/27 | (2006.01) |
| F04D 29/28 | (2006.01) |

(52) U.S. Cl.
CPC ....... F04D 25/0606 (2013.01); F04D 29/053 (2013.01); H02K 1/2733 (2013.01); H02K 7/1823 (2013.01); F04D 29/284 (2013.01); F05B 2220/7068 (2013.01); F05B 2240/60 (2013.01)

(58) Field of Classification Search
CPC ................ H02K 1/2733; H02K 7/1823; F04D 25/0606; F04D 29/053
See application file for complete search history.

(56) References Cited

U.S. PATENT DOCUMENTS

| | | | |
|---|---|---|---|
| 4,311,937 A | 1/1982 | Clark | |
| 9,941,771 B2* | 4/2018 | Garrard | .................. H02K 21/16 |
| 10,408,221 B2* | 9/2019 | Byon | ........................ F01D 5/02 |

(Continued)

FOREIGN PATENT DOCUMENTS

| | | |
|---|---|---|
| JP | 2004-358689 A | 12/2004 |
| JP | 2016-022555 A | 2/2016 |
| KR | 10-1408341 B1 | 6/2014 |

*Primary Examiner* — Robert W Horn
(74) *Attorney, Agent, or Firm* — Mintz Levin Cohn Ferris Glovsky and Popeo, P.C.; Peter F. Corless

(57) ABSTRACT

A rotor assembly for a motor includes a rotor shaft having a journal portion formed in an axial direction and having a predetermined radius about an axis, and a center shaft portion extending along the axial direction from the journal portion and having a radius smaller than a radius of the journal portion about the axis; a cylindrical, integral permanent magnet inserted into the center shaft portion to surround an outer circumferential surface of the center shaft portion and being supported by the journal portion; and a sleeve inserted into the rotor shaft to surround an outer circumferential surface of the journal portion and an outer circumferential surface of the integral permanent magnet, supporting the integral permanent magnet in the axial direction, and supporting the outer circumferential surface of the center shaft portion in the radial direction.

19 Claims, 6 Drawing Sheets

(56) References Cited

U.S. PATENT DOCUMENTS

| | | |
|---|---|---|
| 2019/0145410 A1* | 5/2019 | Hochstetler ............... F04C 2/00 |
| | | 310/67 R |
| 2019/0170062 A1* | 6/2019 | Milosavljevic ......... F02B 39/10 |
| 2019/0207450 A1* | 7/2019 | Hochstetler ........... H02K 7/1823 |
| 2019/0219144 A1* | 7/2019 | Hochstetler ........... F04C 2/3442 |
| 2019/0285073 A1* | 9/2019 | Lee ...................... H02K 7/1823 |
| 2019/0305636 A1* | 10/2019 | Nabeshi ................. F04D 25/06 |

* cited by examiner (a)

(b)

(a)

(b)

ROTOR ASSEMBLY FOR MOTOR

CROSS-REFERENCE TO RELATED APPLICATION

This application claims under 35 U.S.C. § 119(a) the benefit of Korean Patent Application No. 10-2018-0030379 filed in the Korean Intellectual Property Office on Mar. 15, 2018, the entire contents of which are incorporated herein by reference.

BACKGROUND

(a) Technical Field

The present disclosure relates to a rotor assembly for a motor, more particularly, to the rotor assembly for the motor of an electric air compressor employed in a fuel cell system of a fuel cell vehicle.

(b) Description of the Related Art

In general, a fuel cell vehicle includes a fuel cell system that generates electric energy through an electrochemical reaction between hydrogen and air by a fuel cell as a power supply source for driving a driving motor.

The fuel cell system includes a stack of fuel cells, a hydrogen supply system that supplies hydrogen to the stack, an air supply system that supplies air to the stack, and a cooling system that cools heat generated in the stack. The air supply system includes an air compressor for supplying compressed air to the stack and a humidifier for humidifying the compressed air with moisture generated in the stack.

Meanwhile, the air compressor employed in the air supply system of the fuel cell system is an electric air compressor which includes an impeller for compressing air and a driving motor for providing a high rotational force to the impeller.

The driving motor of the electric air compressor includes a stator mounted inside a motor housing and a rotor assembly as a rotor disposed to be adjacent to an internal center of the stator with a gap therebetween.

The rotor assembly coaxially connects the impeller and a permanent magnet to a shaft, has a sleeve surrounding the permanent magnet, and rotates integrally therewith. A rotational movement of the rotor assembly is supported by a journal bearing such as an air foil bearing mounted on a bearing housing.

For example, in the related art rotor assembly, the permanent magnet is mounted on an outer circumferential surface of the shaft. The shaft has coaxially formed journal portions as large diameter portions on both sides thereof and a center portion as a small diameter portion connecting the journal portions.

Here, the permanent magnet is mounted on the center portion. When the permanent magnet is mounted on the center portion, a process of cutting the cylindrical permanent magnet into a semicircular shape and bonding the same with an adhesive on an outer circumferential side of the center portion is used. Meanwhile, the sleeve has a cylindrical shape and assembled to the shaft to surround the permanent magnet, thereby preventing scattering of the permanent magnet during high-speed rotation of the rotor assembly.

The sleeve includes a bearing working surface that supports the journal bearing corresponding to both journal portions of the shaft. The sleeve is assembled to the shaft in a press-fit manner in a state in which an outer circumferential surface of the permanent magnet is ground.

However, in the related art, the permanent magnet may be damaged in the process of cutting the permanent magnet to a semicircular shape, bonding, and grinding the permanent magnet as described above.

Also, the related art uses an unnecessary process such as cutting and bonding the permanent magnet.

Further, in the related art, if the permanent magnets cut off from each other are not accurately bonded or the bonded portions (clearance portions) of the permanent magnets are assembled to deviate in a circumferential direction from the center, performance of the driving motor may be deteriorated.

The above information disclosed in this Background section is only for enhancement of understanding of the background of the disclosure and therefore it may contain information that does not form the prior art that is already known in this country to a person of ordinary skill in the art.

SUMMARY

An exemplary embodiment of the present disclosure provides a rotor assembly for a motor, including: a rotor shaft including a journal portion formed in an axial direction and having a predetermined radius about an axis, and a cylindrical center shaft portion extending along the axial direction from the journal portion and having a radius smaller than a radius of the journal portion about the axis; a cylindrical, integral permanent magnet inserted into the center shaft portion to surround an outer circumferential surface of the center shaft portion and being supported by the journal portion; and a sleeve inserted into the rotor shaft to surround an outer circumferential surface of the journal portion and an outer circumferential surface of the integral permanent magnet, supporting the integral permanent magnet in the axial direction, and supporting the outer circumferential surface of the center shaft portion in the radial direction.

The rotor shaft may be integrally formed with the journal portion and further include a rib portion protruding in the radial direction from a rear side end of the journal portion.

The sleeve may include a first portion supporting the outer circumferential surface of the permanent magnet in the radial direction and supporting the outer circumferential surface of the journal portion in the axial direction; and a second portion integrally provided with the first portion and having an inner circumferential surface integrally formed with the support portion.

An outer circumferential surface of the first portion at a rear side end portion may be provided as a first bearing working surface supporting a rear side journal bearing formed at the rear side end portion, and an outer circumferential surface of the second portion may be provided as a second bearing working surface supporting a front side journal bearing formed at a front side end portion in the radial direction.

A thickness of the second portion may be larger than a thickness of the first portion.

A support portion of the sleeve may protrude from the inner circumferential surface of the sleeve toward a central side of the center shaft portion and support the outer circumferential surface of the center shaft portion and a front side end of the permanent magnet in the axial direction.

The journal portion may have a magnet support end supporting a rear side end of the permanent magnet, and the magnet support end may have a positioning protrusion positioning a home position of the permanent magnet.

A positioning recess coupled with the positioning protrusion may be provided at the rear side end of the permanent magnet.

An impeller of an air compressor may be coupled to a front side end of the center shaft portion.

The journal portion may have a sleeve support end supporting one side end of the sleeve in the axial direction, and an impeller support end supporting the impeller in the axial direction may be provided at a front side end of the sleeve.

Another exemplary embodiment of the present disclosure provides a rotor assembly for a motor, including a rotor shaft, a permanent magnet disposed on the rotor shaft along an axial direction, and a sleeve coupled to the rotor shaft in the axial direction to surround an outer circumferential surface of the permanent magnet, wherein the rotor shaft includes: a first shaft including a first cylindrical journal portion formed at a rear side end in the axial direction and having a predetermined radius about an axis; and a second shaft including a second journal portion integrally formed with a center shaft portion and having a predetermined radius about the axis and the cylindrical center shaft portion having a radius smaller than a radius of the first journal portion, the second shaft being coupled with the first journal portion through the center shaft portion, wherein the center shaft portion extends from both ends of the second journal portion in the axial direction.

The permanent magnet may be configured to have an integral cylindrical shape and fitted into the center shaft portion of the second shaft on the rear side, and the rear side end may be supported by the first journal portion in the axial direction, and a front side end is supported by the second journal portion in the axial direction.

The first shaft may further include: a rib portion integrally formed with the first journal portion and protruding from the rear side end of the first journal portion in a radial direction.

A coupling recess coupled with the center shaft portion of the second shaft on the rear side may be provided at the front side end of the first journal portion.

An outer circumferential surface of the first journal portion coupled with a rear side of the sleeve may be provided as a first bearing working surface supporting a rear side journal bearing formed at a rear side end portion in the radial direction, and an outer circumferential surface of the sleeve on a front side may be provided as a second bearing working surface supporting a front side journal bearing formed at a front side end portion in the radial direction.

The first journal portion may have a magnet support end supporting a rear side end of the permanent magnet, and magnet support end may have a positioning protrusion positioning a home position of the permanent magnet.

A positioning recess coupled with the positioning protrusion may be provided at the rear side end of the permanent magnet.

An impeller of an air compressor may be coupled to a front side end of the center shaft portion formed on a front side of the second shaft in the axial direction.

The first journal portion may have a sleeve support end supporting a rear side end of the sleeve in the axial direction.

BRIEF DESCRIPTION OF THE DRAWINGS

The drawings are used to be referred to in describing exemplary embodiments of the present disclosure, so a technical concept of the present disclosure should not be meant to restrict the disclosure to the accompanying drawings.

DETAILED DESCRIPTION OF THE EXEMPLARY EMBODIMENTS

Figure 1:
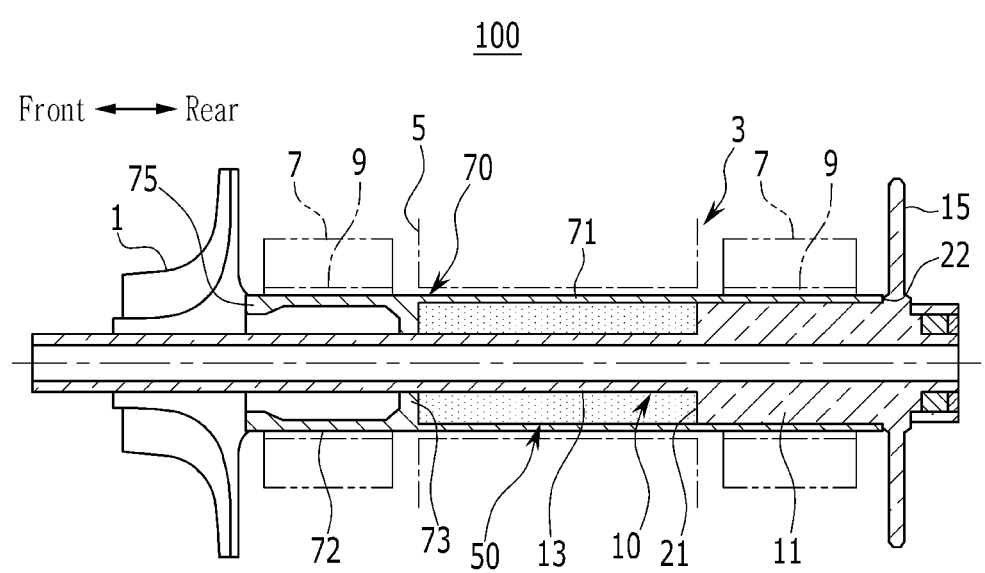
FIG. 1 is a cross-sectional view illustrating a rotor assembly for a motor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure.

In order to clarify the present disclosure, parts irrespective of description will be omitted, and similar reference numerals are used for the similar parts throughout the specification.

The size and thickness of each element are arbitrarily illustrated in the drawings, and the present disclosure is not necessarily limited thereto. In the drawings, the thickness of layers, films, panels, regions, etc., are exaggerated for clarity.

In the following descriptions, terms such as "first" and "second," etc., may be used only to distinguish one component from another as pertinent components are named the same, and order thereof is not limited.

Figure 2:
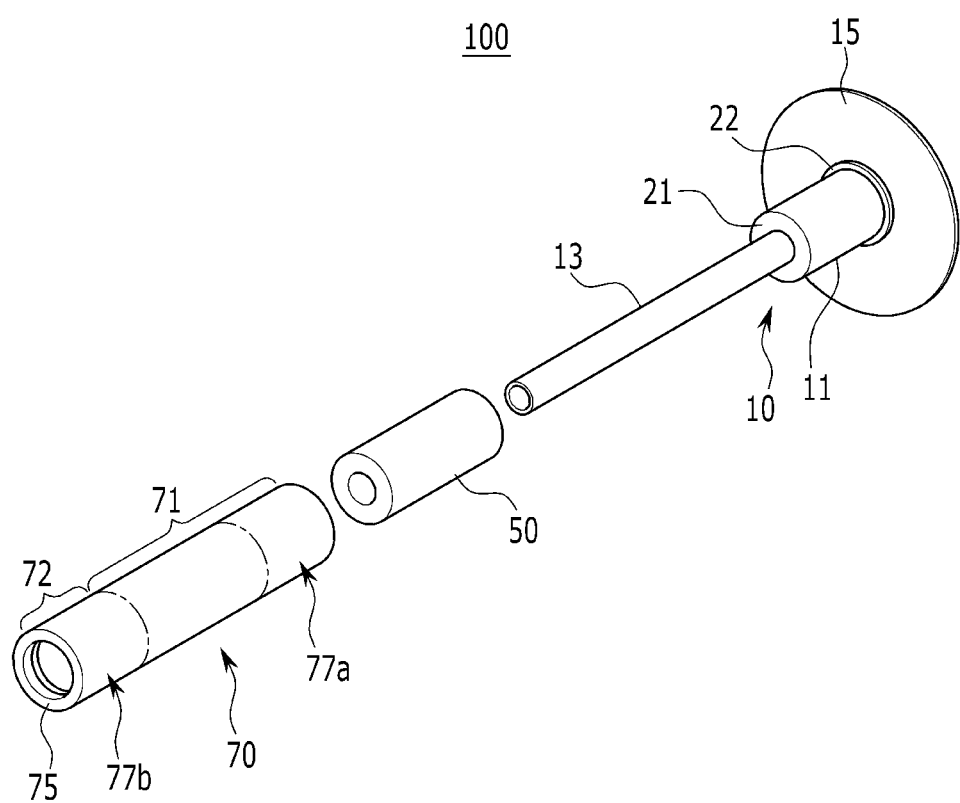
FIG. 2 is an exploded perspective view illustrating a rotor assembly for a motor according to an exemplary embodiment of the present disclosure.

FIG. 1 is a cross-sectional view illustrating a rotor assembly for a motor according to an exemplary embodiment of the present disclosure, and FIG. 2 is an exploded perspective view illustrating a rotor assembly for a motor according to an exemplary embodiment of the present disclosure.

Referring to FIGS. 1 and 2, a rotor assembly 100 for a motor according to an exemplary embodiment of the present disclosure may be applied to a fuel cell system that produces electric energy through an electrochemical reaction between hydrogen and air.

Such a fuel cell system may be applied, for example, to a fuel cell vehicle that operates a driving motor by electric energy and drives wheels with a driving force of the driving motor.

Further, the rotor assembly 100 for a motor according to an exemplary embodiment of the present disclosure may be applied to an air compressor of an air supply system for supplying air to a fuel cell stack in a fuel cell system of a fuel cell vehicle.

For example, the air compressor may be provided as an electric air compressor capable of sucking and compressing air through an impeller 1 rotating at a high speed according to driving of a motor and supplying the compressed air to a humidifier of the air supply system.

However, it should be understood that coverage of the present disclosure is not limited to the electric air compressor of a fuel cell system, and the technical concept of the rotor assembly 100 for a motor according to an exemplary embodiment of the present disclosure may be applied to various types and purposes of electric fluid compressors.

Meanwhile, the electric air compressor includes the impeller 1 for compressing air and a driving motor 3 (also referred to as a "high-speed motor" in the art) for providing a high rotational force to the impeller 1.

Here, the driving motor 3 includes a stator 5 mounted inside a motor housing (not shown) and a rotor disposed to be adjacent to the internal center of the stator 5 with a predetermined gap therebetween. In an exemplary embodiment of the present disclosure, the rotor assembly 100 corresponds to the rotor. Further, a size of the predetermined gap is a certain value determined by a person skilled in the art.

The rotor assembly 100 according to an exemplary embodiment of the present disclosure is rotatably mounted in a motor housing with the journal bearing 9 interposed therebetween.

The rotor assembly 100 is connected to the impeller 1, and the impeller 1 and the rotor assembly 100 may rotate integrally with respect to an axial direction. The journal bearings 9 are installed at a bearing housing 7 mounted on the motor housing and installed symmetrically on both sides of the rotor assembly 100. The journal bearing 9 supports the weight of the rotor assembly 100 itself and a load applied to the rotor assembly 100.

For example, the journal bearing 9 may be an air foil bearing that supports a radial load perpendicular to the axial direction of the assembly 100. The air foil bearing is effective for supporting a rotating body (as provided herein, a rotary shaft) rotating at a high speed, as well known in the art.

In this disclosure, the journal bearing 9 may be an air foil bearing. In the exemplary embodiment of the present disclosure, the axial direction of the rotor assembly 100 is defined as a forward/backward direction. In particular, with respect to the permanent magnet 50, a direction in which the motor housing 100 and the impeller 1 are coupled is defined as a front side and a direction in which a rib portion 15 is formed is defined as a rear side.

Also, a direction perpendicular to the axial direction of the rotor assembly 100 will be defined as a radial direction. Also, in the following description, an "end (one end or the other end)" may be defined as either end, and may be defined as a certain portion (one end or the other end) including a tip thereof.

The definition of the directions has a relative meaning, and the direction may vary depending on a reference position and an assembling position of the rotor assembly 100, and thus, the reference direction is not limited as a reference direction of the present exemplary embodiment.

The rotor assembly 100 for a motor according to an exemplary embodiment of the present disclosure has a structure in which the permanent magnet 50 that makes an electromagnetic action of the rotor is assembled as an integrally cylindrical shape without being cut in a semicircular shape.

The rotor assembly 100 for a motor according to an exemplary embodiment of the present disclosure basically includes a rotor shaft 10, a permanent magnet 50, and a sleeve 70.

In an exemplary embodiment of the present disclosure, the rotor shaft 10 axially penetrates the rotor assembly 100 and serves as an rotational center axis of the rotor assembly 100.

The impeller 1 is mounted on a front end of the rotor shaft 10.

Further, the rotor shaft 10 may be configured as a hollow shaft.

When the rotor shaft 10 is configured as a hollow shaft, an internal space of the rotor shaft 10 may be used as a flow passage allowing a cooling medium such as a cooling oil to flow in the axial direction.

The rotor shaft 10 includes a journal portion 11, a center shaft portion 13, and the rib portion 15 in an exemplary embodiment of the present disclosure.

The journal portion 11 is formed at an axially rear end of the rotor assembly 100 about an axis.

The journal portion 11 also includes a magnet support end 21 and a sleeve support end 22.

The magnet support end 21 and the sleeve support end 22 will be described later with reference to FIG. 3.

The center shaft portion 13 extends on the basis of the axis from the journal portion 11 to the front side end along the axial direction.

The journal portion 11 and the center shaft portion 13 have a cylindrical shape and the radius of the journal portion 11 about the axis is larger than the radius of the center shaft portion 13 about the axis.

The above-mentioned impeller 1 is mounted on the front end of the center shaft portion 13.

The rib portion 15 is positioned in the vicinity of the boundary between the motor housing and a scroll (not shown) and formed integrally with the journal portion 11 on the rear end side of the journal portion 11.

The radius of the rib portion 15 about the axis is larger than the radius of the journal portion 11 about the axis and the rib portion 15 protrudes at a rear side end of the journal portion 11 in the radial direction.

In an exemplary embodiment of the present disclosure, the permanent magnet 50 has a cylindrical shape and is fitted into the center shaft portion 13 from the front side to the rear side along the axial direction. Therefore, a rear side end of the permanent magnet 50 may be axially supported by the journal portion 11.

The permanent magnet 50 provides a rotational driving force to the rotor shaft 10 through an electromagnetic interaction with a driving current input to the stator 5. Also, the permanent magnet 50 includes a positioning recess 25 (See FIG. 3). The positioning recess 25 will be described later with reference to FIG. 3.

The sleeve 70 is cylindrical, surrounds the outer circumference of the permanent magnet 50, and is rotated together with the rotor shaft 10. Therefore, the sleeve 70 may prevent scattering of the permanent magnet 50 due to rotation of the rotor shaft 10. The sleeve 70 surrounds the outer circumferential surface of the permanent magnet 50 and is coupled to the rotor shaft 10 in an axial direction of the rotor shaft 10 in a press-fit manner. An inner circumferential surface of the sleeve 70 is in contact with an outer circumferential surface of the permanent magnet 50 and an outer circumferential surface of the journal portion 11.

The sleeve 70 may be formed of steel.

The sleeve 70 includes a first portion 71 and a second portion 72.

The first portion 71 refers to a rear side end portion of the sleeve 70 and supports the outer circumferential surfaces of the permanent magnet 50 and the journal portion 11 in a radial direction.

The second portion 72 refers to a front side end of the sleeve 70 and a support portion 73 is integrally formed on an inner circumferential surface thereof and an impeller support end 75 is formed on the front side end. The first portion 71 and the second portion 72 are integrally formed, and since the support portion 73 is integrally formed on the inner circumferential surface of the second portion 72, a thickness of the second portion 72 is thicker than a thickness of the first portion 71.

The support portion 73 is formed in an inner circumferential direction of the second portion 72 at a boundary point between the first portion 71 and the second portion 72 and protrudes from the inner circumferential surface of the second portion 72 to the center shaft portion 13 in the radial direction.

The support portion 73 supports the outer circumferential surface of the center shaft portion 13 in the radial direction on an inner side of the sleeve 70 and supports the front side end of the permanent magnet 50 in the axial direction.

Meanwhile, the journal bearing 9 is disposed at both end portions of the sleeve 70 as described above.

Also, since the sleeve 70 forms a working surface of the journal bearing 9, it is closely related to performance of the journal bearing 9.

Therefore, the dimensions and roughness of a portion where the journal bearing 9 is disposed must be precisely machined. Thus, an outer circumferential surface of the first portion 71 corresponding to the journal portion 11 may be a first bearing working surface 77a that supports the rear side journal bearing 9 in the radial direction.

Also, an outer circumferential surface of the second portion 72 may be a second bearing working surface 77b that radially supports the front side journal bearing 9 through the support portion 73.

In the sleeve 70, the second portion 72 forms the support portion 73 formed on the inner circumferential surface thereof and forms the second bearing working surface 77b formed on the outer circumferential surface thereof.

Thus, the second portion 72 substantially surrounds the front side of the rotor shaft 10 and functions as a journal portion supporting the journal bearing 9.

Hereinafter, a coupling structure of the permanent magnet 50 will be described with reference to FIG. 3.

Figure 3:
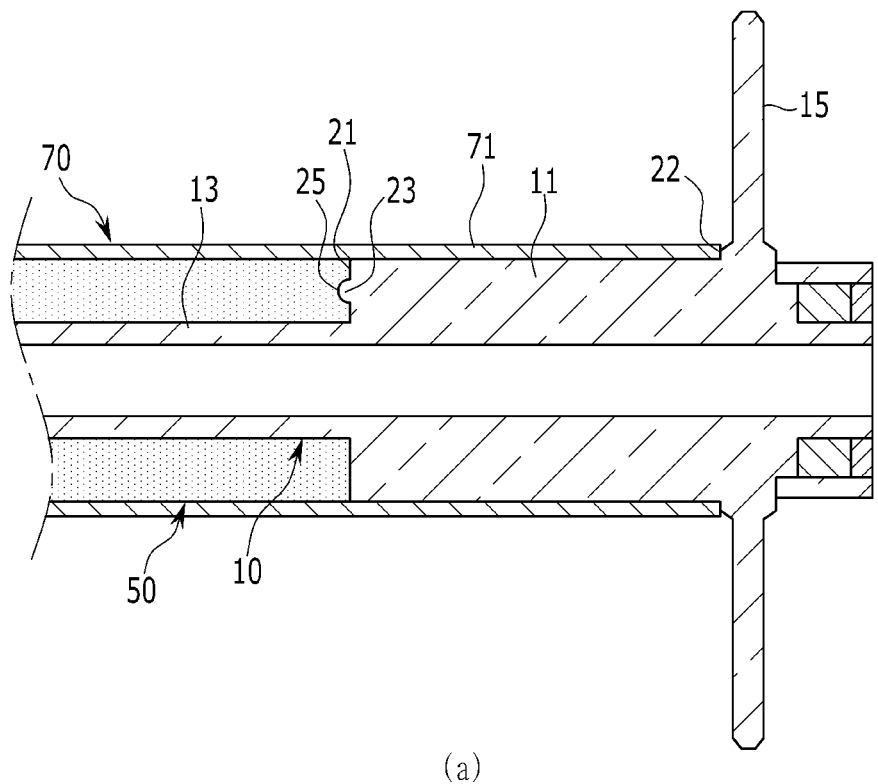
FIG. 3 is a view illustrating a coupled structure of a permanent magnet applied to a rotor assembly for a motor according to an exemplary embodiment of the present disclosure.
Figure 3:
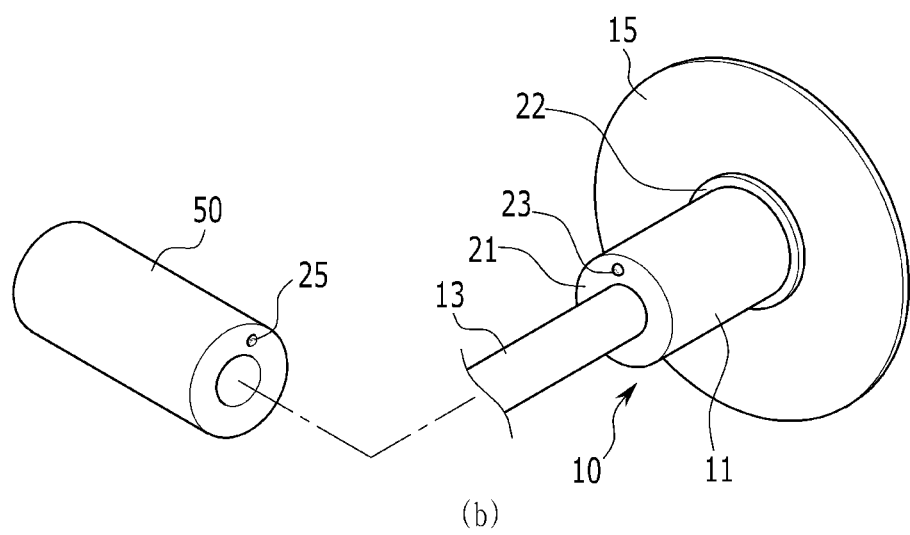

FIG. 3 is a view illustrating a coupled structure of a permanent magnet applied to a rotor assembly for a motor according to an exemplary embodiment of the present disclosure.

As illustrated in FIG. 3, the journal portion 11 according to an exemplary embodiment of the present disclosure includes a magnet support end 21 and a sleeve support end 22.

The magnet support end 21 is formed at the front side end of the journal portion 11 and axially supports the rear side end of the permanent magnet 50 fitted into the center shaft portion 13 in the axial direction.

A positioning unit is provided at the magnet support end 21 and the rear side end of the permanent magnet 50 supported by the magnet support end 21.

The positioning unit, which is configured to determine a set electromagnetic working position (home position) of the permanent magnet 50, includes at least one positioning protrusion 23 and a positioning recess 25 corresponding to the positioning protrusion 23.

The positioning protrusion 23 protrudes in a hemispherical shape and is formed on the magnet support end 21, and the positioning recess 25 is formed on the rear side end of the permanent magnet 50.

The positioning protrusion 23 and the positioning recess 25 are engaged and the coupling may be male-female engagement.

The sleeve support end 22 is formed at a rear side end portion of the journal portion 11 and supports the rear side end of the sleeve 70. That is, when the sleeve 70 is coupled to the magnetic permanent 50 in a surrounding manner, the rear end of the first portion 71 of the sleeve 70 is axially supported by the sleeve support end 22.

Hereinafter, an assembling process and operation of the rotor assembly 100 for a motor according to an exemplary embodiment of the present disclosure will be described in detail with reference to the accompanying drawings.

The rotor assembly 100 for a motor according to an exemplary embodiment of the present disclosure includes the rotor shaft 10, the permanent magnet 50, and the sleeve 70 as described above.

The journal portion 11, the center shaft portion 13, and the rib portion 15 are integrally formed in the rotor shaft 10.

The permanent magnet 50 is integral and has a cylindrical shape.

The sleeve 70 has a cylindrical shape and the support portion 73 is integrally formed on the inner circumferential surface of the sleeve 70.

An assembling process of the rotor assembly 100 configured as described above will be described hereinafter.

In an exemplary embodiment of the present disclosure, the permanent magnet 50 is fitted into the center shaft portion 13 of the rotor shaft 10 in the axial direction.

Here, the permanent magnet 50 is fitted from the front side to the rear side of the center shaft portion 13.

Accordingly, the rear side end of the permanent magnet 50 is axially supported by the magnet support end 21 of the journal portion 11.

The positioning protrusion 23 of the magnet support end 21 is inserted into the positioning recess 25 at the rear side end of the permanent magnet 50 in the process of fitting the permanent magnet 50 into the center shaft portion 13.

Therefore, in an exemplary embodiment of the present disclosure, the permanent magnet 50 may be home-positioned at the electromagnetic working position of the rotor shaft 10 through male and female engagement of the positioning protrusion 23 and the positioning recess 25.

Thereafter, the cylindrical sleeve 70 is coupled to the rotor shaft 10 in a press-fit manner in the axial direction to surround the outer circumferential surface of the permanent magnet 50.

In this case, the inner circumferential surface of the sleeve 70 is in surface contact with the outer circumferential surfaces of the permanent magnet 50 and the journal portion 11.

The outer circumferential surface of the permanent magnet 50 and the outer circumferential surface of the journal portion 11 are subjected to a surface grinding process to have a predetermined dimension, and the set dimension is a certain value determined by a person skilled in the art. Here, the outer circumferences of the permanent magnet 50 and the journal portion 11 are radially supported by the first portion 71 of the sleeve 70, and the first portion 71 is supported by the sleeve support end 22 of the journal portion 11.

In this process, the support portion 73 supports the outer circumferential surface of the center shaft portion 13 in the radial direction and supports the front side end of the permanent magnet 50 in the axial direction.

In this manner, in a state in which the rotor shaft 10, the permanent magnet 50, and the sleeve 70 are assembled, the rotor assembly 100 is mounted on the bearing housing 7 along the axial direction.

Here, the journal bearing 9 is installed on an inner side of the bearing housing 7. The first bearing working surface 77a of the first portion 71 supports the journal bearing 9 of the rear side bearing housing 7.

Also, the second bearing working surface 77b of the second portion 72 supports the journal bearing 9 of the front side bearing housing 7.

Thereafter, in an exemplary embodiment of the present disclosure, the impeller 1 is mounted on the front side end portion of the center shaft portion 13 penetrating through the sleeve 70.

Here, the impeller 1 is supported by the impeller support end 75 formed at the front side end of the second portion 72.

Therefore, in an exemplary embodiment of the present disclosure, assembling the rotor assembly 100 is completed through the series of processes described above.

The rotor assembly 100 rotates at a high speed according to an electromagnetic interaction between a driving current as an actuation signal input to the stator 5 and the permanent magnet 50 provided at the rotor shaft 10, and the impeller 1 coaxially connected therewith is rotated at a predetermined rotational speed according to the input current.

In the case of the rotor assembly 100 for a motor according to the exemplary embodiment of the present disclosure as described above, the permanent magnet 50 may be assembled in an integrally cylindrical shape to the rotor shaft 10, without being cut to a hemispherical shape as in the related art.

As a result, in the exemplary embodiment of the present disclosure, driving stability of the motor may be ensured and the cutting and bonding process of the permanent magnet as in the related art may be eliminated, and thus, workability and productivity may be improved and damage to the permanent magnet may be prevented.

In addition, in the exemplary embodiment of the present disclosure, since the journal portion supporting the air foil bearing 9 is integrally formed in the sleeve 70 itself, the weight of the entire rotor assembly 100 may be reduced. Further, in the exemplary embodiment of the present disclosure, since the integrally cylindrical permanent magnet 50 is assembled to the rotor shaft 10 and the permanent magnet 50 is home-positioned at the set electromagnetic working position of the rotor shaft 10 through the positioning unit, performance of the motor may be improved.

Figure 4:
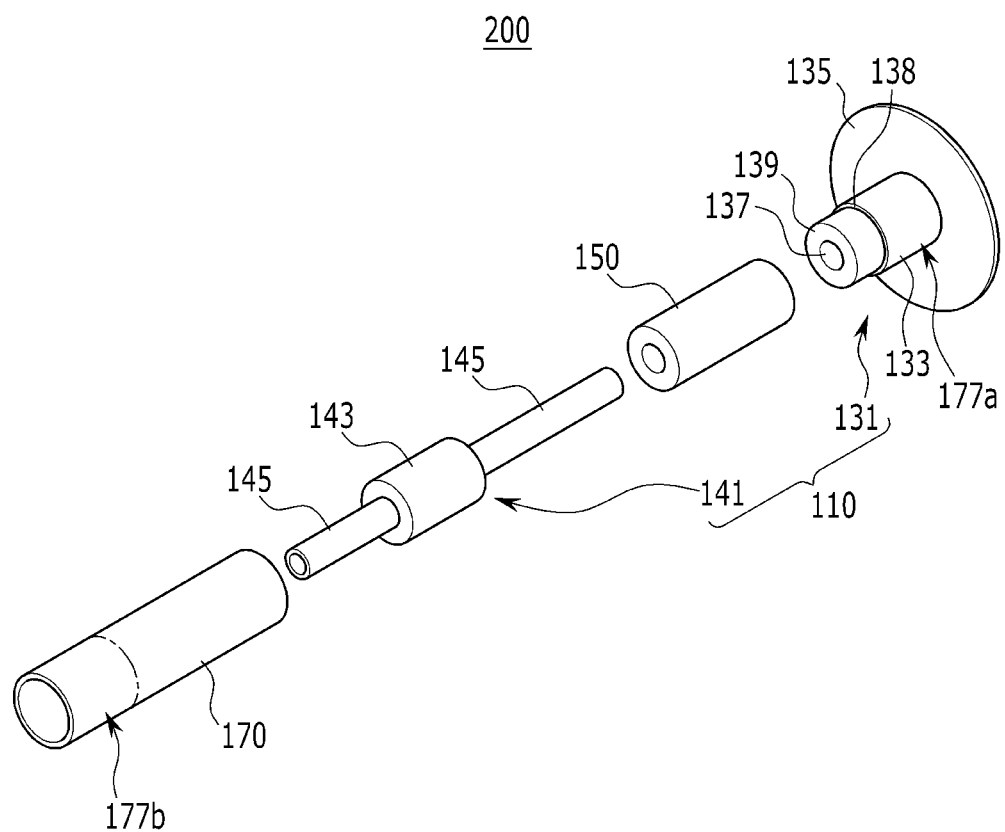
FIG. 4 is an exploded perspective view illustrating a rotor assembly for a motor according to another exemplary embodiment of the present disclosure.
Figure 5:
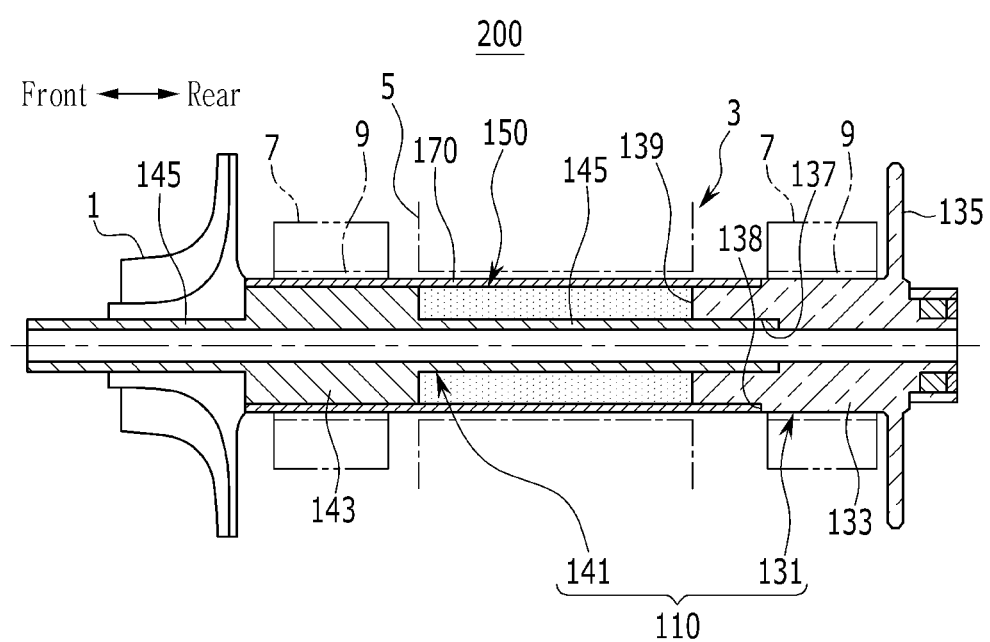
FIG. 5 is a coupled cross-sectional view illustrating a rotor assembly for a motor according to another exemplary embodiment of the present disclosure.

FIG. 4 is an exploded perspective view illustrating a rotor assembly for a motor according to another exemplary embodiment of the present disclosure, and FIG. 5 is a coupled cross-sectional view illustrating a rotor assembly for a motor according to another exemplary embodiment of the present disclosure.

Referring to FIGS. 4 and 5, a rotor assembly 200 for a motor according to another exemplary embodiment of the present disclosure includes a rotor shaft 110, a permanent magnet 150, and a sleeve 170.

The rotor shaft 110 may be configured as a separable/coupled type in which the permanent magnet 150 may be assembled in an integrally cylindrical shape. Also, the rotor shaft 110 includes first and second shafts 131 and 141 of a separable/coupled type.

The first shaft 131 is positioned on a rear side of the rotor assembly 200 and includes a first journal portion 133, a rib portion 135, and a coupling recess 137.

The first journal portion 133 is coupled with the sleeve 170 and supports the journal bearing 9 on the rear side in a radial direction.

The rib portion 135 is formed integrally with the first journal portion 133 on the rear end side of the first journal portion 133.

The radius of the rib portion 135 about the axis is larger than the radius of the first journal portion 133 about the axis and the rib portion 135 protrudes at a rear end portion of the first journal 133 in a radial direction.

The coupling recess 137 is formed at a front side end of the first journal portion 133, and the center shaft portion 145 of the second shaft 141 is connected to the first shaft 141 through the coupling recess 137.

The second shaft 141 is positioned on the front side of the rotor assembly 200 and is provided separately from the first shaft 131.

The second shaft 141 is configured to be coupled with the first journal portion 133 of the first shaft 131.

The second shaft 141 includes the second journal portion 143 and the center shaft portion 145 which are integrally formed. A radius of the second journal portion 143 about the axis is equal to the radius of the first journal portion 133 about the axis.

The radius of the second journal portion 143 about the axis is larger than the radius of the center shaft portion 145 about the axis.

The second journal portion 143 is coupled with the sleeve 170 and supports the journal bearing 9 at the front end in the radial direction.

The center shaft portion 145 is integrally formed with the second journal portion 143 and extends in the axial direction from both ends of the second journal portion 143. Here, the rear end side center shaft portion 145 extending in the axial direction from the rear side end of the second journal portion 143 may be coupled to the first journal portion 133 of the first shaft 131 along the axial direction.

That is, the center shaft portion 145 may be coupled from the front side end to the rear side end of the first journal portion 133 through the coupling recess 137 formed at the first journal portion 133 along the axial direction.

The impeller 1 may be mounted on the front side center shaft portion 145 extending in the axial direction from the front side end of the second journal portion 143.

In a state in which the second shaft 141 is separated from the first shaft 131, the permanent magnet 150 is inserted into the rear side center shaft portion 145 of the second shaft 141 from the rear side to the front side along the axis direction.

The first shaft 131, the second shaft 141, and the permanent magnet 150 are coupled in the axial direction by coupling the rear side of the center shaft portion 145 to which the permanent magnet 150 is coupled, to the coupling recess 137.

Accordingly, the rear side end of the permanent magnet 150 is supported in the axial direction by the first journal portion 133 of the first shaft 131. The front side end of the permanent magnet 150 is axially supported by the second journal portion 143 of the second shaft 141.

Figure 6:
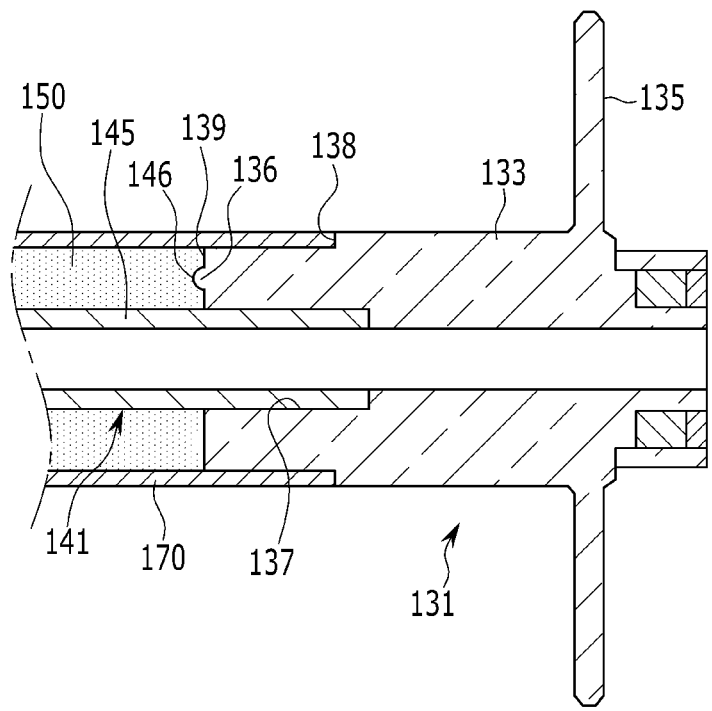
FIG. 6 is a coupled structure of a permanent magnet applied to a rotor assembly for a motor according to another exemplary embodiment of the present disclosure.
Figure 6:
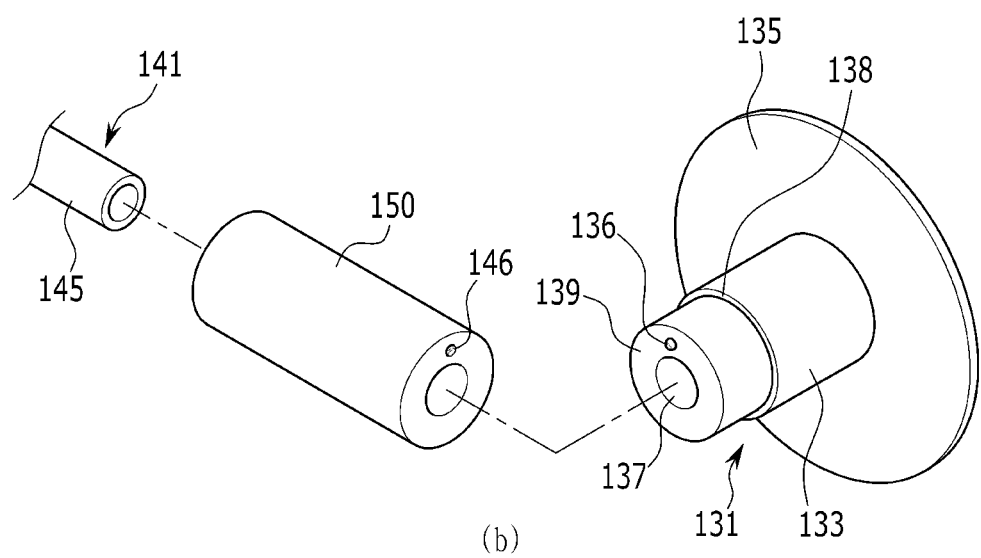

The permanent magnet 150 has an integrally cylindrical shape and includes a positioning recess 146 (see FIG. 6).

The positioning recess 146 will be described later with reference to FIG. 6.

The sleeve 170 has an integrally cylindrical shape and a cross-section of the sleeve 170 has the same shape along the axial direction.

The sleeve 170 is fitted into surround the outer circumferential surface of the permanent magnet 150 along the axial direction and is coupled to the outer circumferential surfaces of the first and second journal portions 133 and 143 in a press-fit manner.

The inner circumferential surface of the sleeve 170 is in surface contact with the outer circumferential surface of the permanent magnet 150 and the outer circumferential surfaces of the first and second journal portions 133 and 143. Accordingly, the outer circumferential surfaces of the first and second journal portions 133 and 143 are radially supported by the inner circumferential surface of the sleeve 170. Also, the rear side end of the sleeve 170 is coupled to the outer circumferential surface of the first journal portion 133 of the first shaft 131.

The front side end of the sleeve 170 supports the impeller 1 mounted on the front side end of the second shaft 141.

In this case, the outer circumferential surface of the first journal portion 133 of the sleeve 170 may be a first bearing working surface 177a that supports the rear side journal bearing 9.

Also, the front side outer circumferential surface of the sleeve 170 may be a second bearing working surface 177b that supports the front side journal bearing 9.

Hereinafter, the coupling structure of the permanent magnet 150 will be described with reference to FIG. 6.

FIG. 6 is a coupled structure of a permanent magnet applied to a rotor assembly for a motor according to another exemplary embodiment of the present disclosure.

As illustrated in FIG. 6, the first journal portion 133 according to an exemplary embodiment of the present disclosure includes a sleeve support end 138 and a magnet support end 139.

The magnet support end 139 supports the rear side end of the permanent magnet 150 formed on the front side of the first journal portion 133 and fitted into the rear side of the center shaft portion 145. A positioning unit is provided at the rear side end of the magnet support end 139 and the permanent magnet 150.

The positioning unit, which is configured to determine a set electromagnetic working position (home position) of the permanent magnet 150, includes at least one positioning protrusion 136 and a positioning recess 146 corresponding to the positioning protrusion 136.

The positioning protrusion 136 protrudes in a hemispherical shape and is formed at a magnet support end 139 of the first journal portion 133.

Also, the positioning recess 146 is formed at the rear side end of the permanent magnet 150 and is coupled with the positioning protrusion 136.

The sleeve support end 138 is formed at the first journal portion 133 and supports the rear side end of the sleeve 170.

That is, when the rear end side center shaft portion 145 coupled to and surrounded by the permanent magnet 150 is coupled to the first shaft 131 through the coupling recess 137, the rear side end of the sleeve 170 is supported by the sleeve support end 138.

Hereinafter, an assembling process of the rotor assembly 200 for a motor according to another exemplary embodiment of the present disclosure will be described in detail with reference to the drawings disclosed hereinbefore.

The rotor assembly 200 for a motor according to an exemplary embodiment of the present disclosure includes the first shaft 131, the second shaft 141, the permanent magnet 150, and the sleeve 170 as described above.

The first shaft 131 includes the first journal portion 133 and the rib portion 135 which are integrally formed.

The second journal portion 143 and the center shaft portion 145 are integrally formed on the second shaft 141.

The permanent magnet 150 is configured as an integrally cylindrical shape.

The sleeve 170 has a cylindrical shape, and the cross-section of the sleeve 170 formed along the axial direction is the same.

An assembling process of the rotor assembly 200 configured as above will be described.

In an exemplary embodiment of the present disclosure, the permanent magnet 150 is axially fitted into the rear side center shaft portion 145 of the second shaft 141.

Here, the permanent magnet 150 is fitted into the rear side center shaft portion 145 from the rear side to the front side.

Next, in an exemplary embodiment of the present disclosure, the rear side center shaft portion 145 of the second shaft 141 is coupled to the coupling recess 137 of the first journal portion 133 in a press-fit manner in the axial direction.

Through the above process, the first shaft 131, the second shaft 141, and the permanent magnet 150 are coupled.

Here, the rear side end of the permanent magnet 150 is axially supported by the magnet support end 139 of the first journal portion 133, and the front side end of the permanent magnet 150 is axially supported by the second journal portion 143.

As described above, the positioning protrusion 136 of the magnet support end 139 is inserted into the rear center shaft portion 145 and the engaging recess 137 of the rear center shaft portion 145 is engaged with the rear center shaft portion 145, Is fitted in the positioning recess 146 of the rear side end of the permanent magnet 150.

Therefore, in an exemplary embodiment of the present disclosure, the permanent magnet 150 may be home-positioned at the electromagnetic working position of the rotor shaft 10 through male and female engagement of the positioning protrusion 136 and the positioning recess 146.

Next, the sleeve 170 is coupled to the outer circumferences of the first and second journal portions 133 and 143 along the axial direction in a press-fit manner. Here, the sleeve 170 surrounds the outer circumference of the permanent magnet 150 and is coupled from the front side to the rear side of the permanent magnet 150. Here, the outer circumferential surface of the permanent magnet 150 and the outer circumferential surfaces of the first and second journal portions 133 and 143 are subjected to a surface grinding process to have a predetermined dimension, and the set dimension is a certain value determined by a person skilled in the art.

In this case, the sleeve 170 is coupled to the outer circumferences of the first and second journal portions 133 and 143 from the front side to the rear side along the axial direction, and an inner circumferential surface of the sleeve 170 is in contact with the outer circumferential surface of the permanent magnet 150 and the outer circumferential surfaces of the first and second journal portions 133 and 143.

The rear side end of the sleeve 170 is supported by the sleeve support end 138 of the first journal portion 133 and is coupled to the front side end of the first journal portion 133.

In this manner, in a state in which the first and second shafts 131 and 141 of the rotor shaft 110, the permanent magnet 150, and the sleeve 170 are assembled, the rotor assembly 200 is axially mounted on the bearing housing 7 supported by both sides of the motor housing.

Here, the journal bearing 9 is installed on an inner side of the bearing housing 7.

Accordingly, the first bearing working surface 177a of the first journal portion 133 supports the journal bearing 9 of the one side bearing housing 7.

Also, the second bearing working surface 177b of the sleeve 170 supports the journal bearing 9 of the other side bearing housing 7.

Next, in an exemplary embodiment of the present disclosure, the impeller 1 is mounted on the front side end portion of the other front side center shaft portion 145 of the second shaft 141 penetrating through the sleeve 170.

Here, the impeller 1 is supported by the other end of the sleeve 170.

Therefore, in an exemplary embodiment of the present disclosure, assembling the rotor assembly 200 is completed through the series of processes described above.

In the case of the rotor assembly 200 according to another exemplary embodiment of the present disclosure as described above, since the rotor shaft 110 is configured as the separate first and second shafts 131 and 141, the permanent magnet 150 may be assembled in an integrally cylindrical shape to the rotor shaft 110, without being cut to a hemispherical shape as in the related art.

Further, according to another exemplary embodiment of the present disclosure, since the rotor shaft 110 is configured as the separate first and second shafts 131 and 141, workability may be improved and the amount of material required for machining may be reduced as compared with an integral structure of the first and second shafts 131 and 141.

The remaining operational effects of the rotor assembly 200 according to another exemplary embodiment of the present disclosure are the same as those of the previous exemplary embodiment, and thus, a detailed description thereof will be omitted.

While this disclosure has been described in connection with what is presently considered to be practical exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A rotor assembly for a motor, the rotor assembly comprising:
   a rotor shaft including a journal portion formed in an axial direction of the rotor shaft and having a predetermined radius about an axis, and a center shaft portion extending along the axial direction from the journal portion and having a radius smaller than a radius of the journal portion about the axis;
   a cylindrical, integral permanent magnet inserted into the center shaft portion to surround an outer circumferential surface of the center shaft portion and being supported by the journal portion; and
   a sleeve inserted into the rotor shaft to surround an outer circumferential surface of the journal portion and an outer circumferential surface of the integral permanent magnet, supporting the integral permanent magnet in the axial direction, and supporting the outer circumferential surface of the center shaft portion in the radial direction.

2. The rotor assembly of claim 1, wherein:
   the rotor shaft is integrally formed with the journal portion and further includes a rib portion protruding in the radial direction from a rear side end of the journal portion.

3. The rotor assembly of claim 1, wherein the sleeve includes:
   a first portion supporting the outer circumferential surface of the permanent magnet in the radial direction and supporting the outer circumferential surface of the journal portion in the axial direction; and
   a second portion integrally provided with the first portion and having an inner circumferential surface integrally formed with the support portion.

4. The rotor assembly of claim 3, wherein:
   an outer circumferential surface of the first portion is provided as a first bearing working surface supporting a rear side journal bearing, and
   an outer circumferential surface of the second portion is provided as a second bearing working surface supporting a front side journal bearing.

5. The rotor assembly of claim 3, wherein:
   a thickness of the second portion is larger than a thickness of the first portion.

6. The rotor assembly of claim 1, wherein:
   a support portion of the sleeve protrudes from the inner circumferential surface of the sleeve toward a central side of the center shaft portion and supports the outer circumferential surface of the center shaft portion and a front side end of the permanent magnet in the axial direction.

7. The rotor assembly of claim 1, wherein:
the journal portion has a magnet support end supporting a rear side end of the permanent magnet, and
the magnet support end has a positioning protrusion positioning a home position of the permanent magnet.

8. The rotor assembly of claim 7, wherein:
a positioning recess coupled with the positioning protrusion is provided at the rear side end of the permanent magnet.

9. The rotor assembly of claim 1, wherein:
an impeller of an air compressor is coupled to a front side end of the center shaft portion.

10. The rotor assembly of claim 9, wherein:
the journal portion has a sleeve support end supporting one side end of the sleeve in the axial direction, and
an impeller support end supporting the impeller in the axial direction is provided at a front side end of the sleeve.

11. A rotor assembly for a motor, including a rotor shaft, a permanent magnet disposed on the rotor shaft along an axial direction, and a sleeve coupled to the rotor shaft in the axial direction to surround an outer circumferential surface of the permanent magnet, wherein the rotor shaft includes:
a first shaft including a first journal portion provided in the axial direction and having a predetermined radius about an axis; and
a second shaft including a second journal portion integrally formed with a center shaft portion and having a predetermined radius about the axis and the center shaft portion having a radius smaller than a radius of the first journal portion, the second shaft being coupled with the first journal portion through the center shaft portion,
wherein the center shaft portion extends from both ends of the second journal portion in the axial direction.

12. The rotor assembly of claim 11, wherein:
the permanent magnet is configured to have an integral cylindrical shape and fitted into the center shaft portion of the second shaft on the rear side, and
a rear side end of the permanent magnet is supported by the first journal portion in the axial direction, and a front side end of the permanent magnet is supported by the second journal portion in the axial direction.

13. The rotor assembly of claim 11, wherein the first shaft further includes:
a rib portion integrally formed with the first journal portion and protruding from the first journal portion in a radial direction.

14. The rotor assembly of claim 11, wherein:
a coupling recess coupled with the center shaft portion of the second shaft on the rear side is provided in the first journal portion.

15. The rotor assembly of claim 11, wherein:
an outer circumferential surface of the first journal portion coupled with a rear side of the sleeve is provided as a first bearing working surface supporting a rear side journal bearing, and
an outer circumferential surface of the sleeve on a front side is provided as a second bearing working surface supporting a front side journal bearing.

16. The rotor assembly of claim 11, wherein:
the first journal portion has a magnet support end supporting a rear side end of the permanent magnet, and
the magnet support end has a positioning protrusion positioning a home position of the permanent magnet.

17. The rotor assembly of claim 16, wherein:
a positioning recess coupled with the positioning protrusion is provided at the rear side end of the permanent magnet.

18. The rotor assembly of claim 11, wherein:
an impeller of an air compressor is coupled to a front side end of the center shaft portion formed on a front side of the second shaft in the axial direction.

19. The rotor assembly of claim 18, wherein:
the first journal portion has a sleeve support end supporting a rear side end of the sleeve in the axial direction.

* * * * *